United States Patent
Himstedt et al.

(10) Patent No.: US 9,914,645 B2
(45) Date of Patent: Mar. 13, 2018

(54) PROCESS FOR MAKING AMMONIA

(71) Applicant: Regents of the University of Minnesota, Minneapolis, MN (US)

(72) Inventors: Heath H. Himstedt, Minneapolis, MN (US); Mark S. Huberty, Woodbury, MN (US); Alon V. McCormick, Minneapolis, MN (US); Lanny D. Schmidt, Minneapolis, MN (US); Edward L. Cussler, Edina, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 694 days.

(21) Appl. No.: 14/535,491

(22) Filed: Nov. 7, 2014

(65) Prior Publication Data
US 2015/0125377 A1 May 7, 2015

Related U.S. Application Data

(60) Provisional application No. 61/901,127, filed on Nov. 7, 2013.

(51) Int. Cl.
*C01C 1/04* (2006.01)
*B01J 8/00* (2006.01)
*C01C 1/00* (2006.01)

(52) U.S. Cl.
CPC .......... *C01C 1/0458* (2013.01); *B01J 8/0005* (2013.01); *C01C 1/006* (2013.01); *Y02P 20/52* (2015.11)

(58) Field of Classification Search
CPC .... B01J 8/0005; C01C 1/0405; C01C 1/0458; C01C 1/006
See application file for complete search history.

(56) References Cited

U.S. PATENT DOCUMENTS

| | | | | |
|---|---|---|---|---|
| 3,287,086 A | * | 11/1966 | Cahn | C01C 1/006 423/359 |
| 5,711,926 A | * | 1/1998 | Knaebel | B01D 53/04 423/359 |
| 8,578,702 B2 | | 11/2013 | Johannessen et al. | |
| 2017/0152149 A1 | | 6/2017 | Malmali et al. | |

FOREIGN PATENT DOCUMENTS

JP  06-136357 A  5/1994

OTHER PUBLICATIONS

Christensen, Claus H., et al., "Metal ammine complexes for hydrogen storage", *Journal of Materials Chemistry*, 15, (2005), 4106-4108.

(Continued)

*Primary Examiner* — Lessanework Seifu
(74) *Attorney, Agent, or Firm* — Quarles & Brady LLP

(57) ABSTRACT

A system for producing ammonia comprises a reactor configured for receiving nitrogen feed gas and hydrogen feed gas, the reactor comprising a catalyst configured to convert at least a portion of the nitrogen gas and at least a portion of the hydrogen feed gas to ammonia to form a reactant mixture comprising the ammonia and unreacted nitrogen feed gas and unreacted hydrogen feed gas, an adsorbent configured to selective adsorb at least a portion of the ammonia from the reactant mixture, and a recycle line to recycle the unreacted nitrogen feed gas, the unreacted hydrogen feed gas, and unabsorbed ammonia to the reactor.

17 Claims, 6 Drawing Sheets

(56) References Cited

OTHER PUBLICATIONS

Himstedt, Heath H., et al., "Ammonia Synthesis Enhanced by Magnesium Chloride Absorption", *AlChE Journal*, 61(4), (Apr. 2015), 1364-1371.

Huberty, Mark S., et al., "Ammonia Absorption at Haber Process Conditions", *AlChE Journal*, 58(11), (Nov. 2012), 3526-3552.

Hummelshoj, Jens S., et al., "Generation of Nanopores during Desorption of $NH_3$ from $Mg(NH3)6Cl2$", *J. Am. Chem. Soc.*, 128, (2006), 16-17.

Jones, Martin O., et al., "The structure and desorption properties of the ammines of the group II halides", *Chemical Physics*, 427, (2013), 38-43.

Liu, Chun Yi, et al., "Absorption and Desorption Behavior of Ammonia with Alkali Earth Halide", *Chemistry Letters*, 31, (2002), 798-799.

Liu, Chun Yi, et al., "Ammonia Absorption into Alkaline Earth Metal Halide Mixtures as an Ammonia Storage Material", *Ind. Eng. Chem. Res.*, 43, (2004), 7484-7491.

Liu, Chun Yi, et al., "Ammonia Absorption on Alkaline Earth Halides as Ammonia Separation and Storage Procedure", *Bull. Chem. Soc. Jpn.*, 77, (2004), 123-131.

Sharonov, Vasily E., et al., "Ammonia Adsorption by $MgCl_2$, $CaCl_2$ and $BaCl_2$ Confined to Porous Alumina: The Fixed Bed Adsorber", *React.Kinet.Catal.Lett.*, 85(1), (2005), 183-188.

Tekin, Adem, et al., "Ammonia dynamics in magnesium ammine from DFT and neutron scattering", *Energy & Environmental Science*, 3, (2010), 448-456.

Van Hassel, Bart A., et al., "Ammonia sorbent development for on-board $H_2$ purification", *Separation and Purification Technology*, vol. 142, (2015), 215-226.

Klerke, Asbjorn, et al., "Ammonia for hydrogen storage: challenges and opportunities", Journal of Materials Chemistry, vol. 18, No. 20, (2008), 2304-2310.

Reese, Michael, et al., "Performance of a Small-Scale Haber Process.", Industrial & Engineering Chemistry Research, vol. 55, (2016), 3742-3750.

Sorensen, Rasmus Z., et al., "Indirect, reversible high-density hydrogen storage in compact metal ammine salts", Journal of the American Chemical Society, vol. 130, (2008), 8660-8668.

\* cited by examiner

PROCESS FOR MAKING AMMONIA

CROSS-REFERENCE TO RELATED APPLICATION

This application claims the benefit of priority under 35 U.S.C. § 119(e) to U.S. Provisional Application Ser. No. 61/901,128, filed on Nov. 7, 2013, the disclosure of which is incorporated herein by reference in its entirety.

BACKGROUND

Ammonia ($NH_3$) is one of the world's most important chemicals. In addition to its primary use in fertilizers, ammonia can also be used as an efficient coolant or a clean, effective fuel.

Manufacturing ammonia has remained surprisingly unchanged for over a century. The Haber-Bosch process has been the predominant process for making ammonia since the early twentieth century. The Haber-Bosch process involves using high pressures and temperatures in large, capital-intensive plants by combining nitrogen gas ($N_2$) and hydrogen gas ($H_2$) over an iron-based catalyst. Although the Haber-Bosch process has undergone decades of optimization, ammonia production still remains limited by thermodynamics to less than 20% conversion in a single pass. In order for Haber-Bosch plants to be economically viable, $NH_3$ must be separated from unreacted $N_2$ and $H_2$, which must then be repressurized, reheated, and recycled. This requires tremendous capital expenditures and a large amount of energy. Haber-Bosch plants account for about 1.5% of global energy consumption. Moreover, the hydrogen gas is typically obtained by steam reforming of natural gas, which releases additional $CO_2$ into the atmosphere.

SUMMARY

The present disclosure describes systems and methods for producing ammonia. The system can comprise a reactor comprising a catalyst for converting nitrogen gas and hydrogen gas to gaseous ammonia. The system can further comprise an absorber comprising a magnesium chloride absorbent for the selective absorption of produced gaseous ammonia. The absorber can be downstream of the reactor to absorb ammonia from a reactor exit stream. The system can further include a recycle line for recycling the absorber exit gas, which can include unabsorbed ammonia and unreacted hydrogen and nitrogen gasses. The recycled absorber exit gas can be fed back into the reactor for further reaction of the nitrogen gas and hydrogen gas in the absorber exit gas. After absorption of the ammonia into the magnesium chloride absorbent is complete, the pressure in the absorber can be reduced to cause desorption of ammonia from the magnesium chloride absorbent.

In an example, the present disclosure describes a system for producing ammonia, the system comprising a reactor configured for receiving nitrogen feed gas (N2) and hydrogen feed gas (H2), the reactor comprising a catalyst configured to convert at least a portion of the nitrogen gas and at least a portion of the hydrogen feed gas to ammonia (NH3) to form a reactant mixture comprising the ammonia and unreacted nitrogen feed gas and unreacted hydrogen feed gas, an adsorbent configured to selective adsorb at least a portion of the ammonia from the reactant mixture, and a recycle line to recycle the unreacted nitrogen feed gas, the unreacted hydrogen feed gas, and unabsorbed ammonia to the reactor.

In another example, the present disclosure describes a method for producing ammonia, the method comprising reacting at least a portion of a nitrogen feed gas (N2) and at least a portion of a hydrogen feed gas (H2) in the presence of a catalyst in a reactor to form ammonia (NH3), wherein unreacted nitrogen gas (N2), unreacted hydrogen gas (H2), and the ammonia (NH3) form a reactant mixture, selectively adsorbing at least a portion of the ammonia from the reactant mixture with an adsorbent, and following the selective adsorbing, recycling the unreacted nitrogen gas, the unreacted hydrogen, and unabsorbed ammonia to the reactor.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

DETAILED DESCRIPTION

Figure 1:
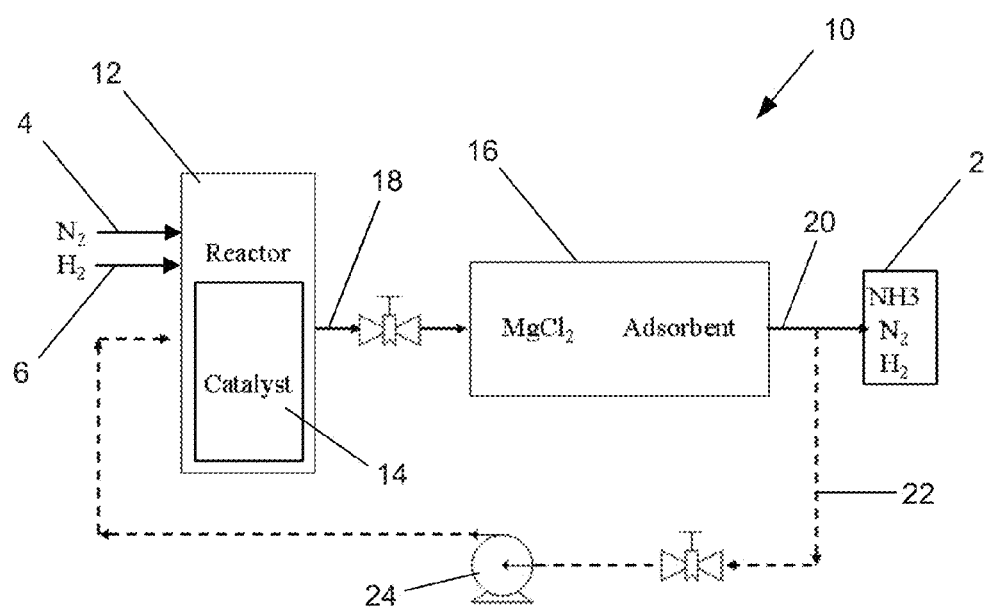
FIG. 1 is a schematic diagram of a system for producing ammonia that includes an absorber with magnesium chloride absorbent.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DESCRIPTION

This disclosure describes systems and methods for ammonia production which can circumvent thermodynamic equilibrium and can provide for economical small-scale production. The systems and methods can utilize an adsorbent that can selectively adsorb ammonia ($NH_3$) as it is formed over the hydrogen gas ($H_2$) and nitrogen gas ($N_2$) gas, such as magnesium chloride ($MgCl_2$), a relatively inexpensive and readily available salt, to selectively absorb $NH_3$. The terms "selectively adsorb" or "selective adsorption," as used herein, can refer to the adsorbent having an affinity for one compound over another, in this case for $NH_3$ over $N_2$ gas or $H_2$ gas. Therefore, "selective adsorption" of $NH_3$, such as with an $MgCl_2$ adsorbent, can refer to adsorbing a substantially higher proportion of the $NH_3$ into the adsorbent while letting a substantially higher proportion the $N_2$ gas and the $H_2$ gas to pass through the adsorbent. The absorbed ammonia can then be easily and rapidly released from the adsorbent, for example by simply increasing the temperature or lowering the pressure.

The systems and methods of the present disclosure can combine traditional ammonia synthesis catalysts and the absorbent into a single system. As ammonia is produced in the catalytic reactor it can be selectively absorbed by the adsorbent, reducing the amount of free ammonia present, and driving the reaction to a higher conversion. The present inventors have discovered that it is possible to achieve greater than 90% conversion to ammonia in a single operation—much greater than the typical approximately 15%-20% conversion achieved in large Haber-Bosch commercial plants. The high conversion rate can reduce or eliminate the need for costly recycling streams, can provide for lower energy requirements, and can reduce capital costs. With this technology it may be possible to reduce the operating pressure and temperature, thus further reducing the energy requirements and the environmental impact of ammonia production compared to current Haber-Bosch plants.

In addition, because the systems and processes of the present invention can be achieved on a small scale compared to the Haber-Bosch process, it can be used to produce ammonia substantially on demand at the site where the ammonia is to be used. For example, if ammonia is desired as a fertilizer, a system in accordance with the present disclosure can be installed on or near a farm on which ammonia fertilizer will be used. The small-scale system of the present disclosure can, therefore, not only greatly reduce the capital and energy required to produce ammonia, as discussed above, but the system can also reduce or substantially eliminate fertilizer transportation costs, further reducing the energy requirements and the environmental impact of ammonia production.

FIG. 1 shows a schematic diagram of an example system 10 for the production of ammonia ($NH_3$) product stream 2 by reacting a nitrogen gas ($N_2$) feed 4 and a hydrogen gas ($H_2$) feed 6. The $N_2$ feed 4 and the $H_2$ feed 6 can be fed into the reactor 12 as two separate lines, as shown in FIG. 1, or as a single, common feed line (not shown). The $N_2$ feed 4 and the $H_2$ feed 6 can be fed into a catalytic reactor 12 comprising a catalyst bed 14.

The reactor 12 can be operated at conditions capable of providing for the conversion of $N_2$ gas from the $N_2$ feed 4 and the $H_2$ gas from the $H_2$ feed 6 to $NH_3$. For example, the reactor 12 can operate at typical Haber-Bosch conditions using a typical Haber-Bosch catalyst 14. In an example, the catalyst bed 14 can include, but is not limited to, an iron oxide based catalyst, such as magnetite ($Fe_3O_4$) or wüstite ($Fe^{[2+]}O$), or a ruthenium-based catalyst. The $N_2$ feed 4 and the $H_2$ feed 6 can be fed into the reactor 12 at a $H_2$:$N_2$ ratio of about 1.5:1 to 3.5:1, such as a $H_2$:$N_2$ molar ratio of about 3:1 (e.g., the stoichiometric ratio for the production of $NH_3$). The reactor 12 can be operated at typical Haber-Bosch conditions, for example with a residence time of the $N_2$ feed 4 and/or the $H_2$ feed 6 of from about 1 second to about 20 seconds, a pressure of from about 50 bar (about 49 atmospheres (atm)) to about 100 bar (about 98 atm), for example about 80 bar (about 79 atm), and at a temperature of from about 350° C. to about 450° C., for example about 400° C. In an example, the catalyst bed 14 can take up from about 10% to about 90% of the volume of the reactor 12, such as from about 12.5% to about 50% of the volume of the reactor 12. In a small-scale example, the reactor 12 has a volume of from about 0.1 L to about 0.5 L, such as about 0.25 L.

The system 10 also includes an absorber 16 connected downstream in series with the reactor 12, for example with a reactor exit stream 18 feeding the absorber 16. The absorber 16 can comprise magnesium chloride ($MgCl_2$) absorbent. The $MgCl_2$ absorbent can absorb ammonia produced in the reactor 12 from the reactor exit stream 18 according to Reactions [1], [2], and [3].

  [1]

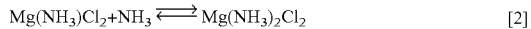  [2]

  [3]

The uptake of ammonia into $MgCl_2$ is selective, e.g., $H_2$ gas and $N_2$ gas are not absorbed by the absorbent, and in this system the $MgCl_2$ acts to only absorb $NH_3$. The uptake of ammonia is also rapid. In addition, $MgCl_2$ forms stable gas-solid complexes with the $NH_3$. The $MgCl_2$ is also robust, stable, and inexpensive. The absorption of $NH_3$ into $MgCl_2$ is described in some detail in Huberty et al., AIChE Journal, Vol. 58, No. 11, pp. 3526-32 (November 2012), the disclosure of which is incorporated herein by reference as if reproduced in its entirety.

Reactions [1], [2], and [3] are temperature dependent. For example, Reaction [1] generally occurs at temperatures above 250° C., Reaction [2] generally occurs at temperatures from about 170° C. to about 230° C., and Reaction [3] generally occurs at temperature below about 150° C. Thus, a first temperature (e.g., a low temperature) can be applied to the gas and the absorbent to allow $NH_3$ to absorb into the absorbent, and a second temperature (e.g., a high temperature) can be applied to the gas and the absorbent to allow the $NH_3$ to desorb from the absorbent.

Reactions [1], [2], and [3] can also be pressure dependent, e.g., with Reaction [1] dominating at pressures around atmospheric pressure, with Reaction [2] beginning to dominate at higher pressures, and with Reaction [3] becoming the dominant mechanism at even higher pressures. Therefore, a first pressure (e.g., a higher pressure) can be applied to the gas and the absorbent to allow $NH_3$ to absorb into the absorbent (e.g., because Reactions [2] and [3] dominate), and a second pressure (e.g., a lower pressure) can be applied to the gas and the absorbent to allow the $NH_3$ to desorb from the absorbent (e.g., so that Reaction [1] dominates and so that it is driven to release $NH_3$).

In other examples, both pressure and temperature can be used to affect adsorption and desorption of $NH_3$. For example, the absorber 16 can be subjected to a first set of conditions selected to provide for adsorption of $NH_3$, e.g. a first relatively low temperature and a first relatively high pressure, until a predetermined desired amount of $NH_3$ has been adsorbed. Then, the absorber 16 can be subjected to a second set of conditions selected to provide for desorption of the $NH_3$ from the adsorbent, e.g., a second relatively high temperature and a second relatively low pressure.

In an example, the system 10 can include an absorber temperature control system (not shown) an absorber pressure control system (not shown), or both, for controlling one or both of the temperature or the pressure that is applied to the adsorbent in order to control adsorption or desorption of $NH_3$ from the adsorbent during operation of the system 10. As will be understood by a person of ordinary skill in the art, a temperature control system can include a temperature sensor (not shown) for measuring a temperature of the absorber 16 or the adsorbent, such as by measuring an exit temperature at an absorber exit stream 20, and a temperature controller that can control a heater or cooler, or both, (not shown) for controlling the temperature of the absorber 16, such as by controlling heating or cooling of the gas within the reactor exit stream 18. As will also be understood by a person of ordinary skill in the art, a pressure control system can include a pressure sensor (not shown) for measuring a pressure within the absorber 16, and a pressure controller that can control a compressor or pressure release (or both) for controlling the pressure within the absorber 16, such as by controlling the pressure of the gas entering the absorber 16 via the reactor exit stream 18.

In an example, the absorber 16 can have a residence time of from about 1 second to about 20 seconds. In a small-scale example, the absorber 16 can have a volume of 0.1 L to about 0.5 L, such as about 0.25 L. The absorber 16 can be operated at a pressure of from about 50 bar (about 49 atm) to about 100 bar (about 98 atm), for example about 80 bar (about 79 atm). The absorber 16 has been shown to provide for similar absorbing performance in a first, lower temperature range of from about 170° C. to about 270° C. and in a second, higher temperature range of from about 300° C. to about 400° C. In an example, the absorber 16 is operated at a temperature of about 200° C. and at a pressure of about 80 bar (79 atm).

In the example system 10 shown in FIG. 1, the absorber 16 is shown as being separate from and downstream of the reactor 12. In another example, not shown, the reactor can include an absorber component incorporated within the reactor so that the absorber and the reactor are integrated together. The integrated reactor can include a catalyst bed module comprising the catalyst and an absorber module comprising the adsorbent, e.g., the $MgCl_2$, for the absorption of produced $NH_3$.

It is believed that the operating temperatures and pressures of the reactor 12 and the absorber 16 described above can be reduced due to optimization to provide for reduced energy requirements while still providing comparable conversion performance of the system.

At least a portion of the absorber exit stream 20 from the absorber 16 can be recycled back into the reactor 12 via a recycle line 22, for example using a recirculation pump 24. The removal of $NH_3$ from the reactor exit stream 18 via absorption into the absorbent, e.g., an $MgCl_2$ adsorbent, can increase the concentration of $N_2$ gas and $H_2$ gas in the recycle line 22, which in turn can increase the concentration of $N_2$ gas and $H_2$ gas in the reactor 12. The concentration increase of $H_2$ and $N_2$ in the reactor 12 can act to drive the forward reaction toward $NH_3$ rather than the reverse reaction from $NH_3$ toward $N_2$ gas and $H_2$ gas. In an example, the recycle flow rate can be from about 10% and about 500% of the combined flow rate of the $N_2$ feed 2 and the $H_2$ feed 4, such as about 50% or 100%. In a small-scale example, the flow rate of recycled gas in the recycle line 22 can be from about 0.25 standard liters per minute (SLPM) to about 10 SLPM.

The system 10 can operate by the following method: $N_2$ and $H_2$ are fed to the reactor 12, e.g., via the feed lines 4, 6, where they react, via a reaction catalyzed by the catalyst in the catalyst bed 14, to form $NH_3$. Unreacted $N_2$ and $H_2$ and produced $NH_3$ flow from the reactor 12 to the absorber 16, e.g., through the reactor exit stream 18, where at least a portion of the $NH_3$ can absorbed by an adsorbent, such as a $MgCl_2$ absorbent. The gasses exiting the absorber 16, e.g., via the absorber exit stream 20, can include unreacted $N_2$ and $H_2$ and unabsorbed $NH_3$, and can be recycled back to the reactor 12, such as via the recycle line 22. The gasses can be allowed to substantially continuously flow and cycle through the system 10 for a period of time until the absorbent becomes substantially saturated with $NH_3$ (e.g., the $MgCl_2$ reaches a predetermined percentage of its absorbed $NH_3$ capacity, which can be determined, for example, by the pressure within the system. The predetermined percentage can be 100% of the theoretical absorption capacity of the adsorbent (for example, as determined based on the mass of $MgCl_2$ absorbent and Reactions [1]-[3]), or some smaller percentage, such as from about 50% to about 99% of the absorption capacity, for example from about 70% to about 95%, such as about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 99.5%, or about 99.9%. After the predetermined percentage of absorption capacity is reached, the gas feeds 2, 4 can be ceased, the recycle can be ceased, e.g., by shutting off the recirculation pump 24, and the pressure in the system 10 can be reduced (e.g., using a pressure release valve and/or a vacuum pump) to desorb the $NH_3$ from the $MgCl_2$ absorbent in the absorber 16 and withdraw the $NH_3$ from the system 10, e.g., via the $NH_3$ product line 2.

As shown below with reference to the Examples, the combined production of $NH_3$ and subsequent absorption of the $NH_3$ can allow the system 10 to surpass typical equilibrium conversion values, which typically peak at about 15% for the Haber-Bosch process. In examples, the system 10 can provide for conversion to ammonia of at least about 50%, such as at least about 55%, for example at least about 60%, such as at least about 65%, for example as at least about 70%, such as at least about 75%, for example at least about 80%, such as at least about 85%, for example at least about 86%, 87%, 88%, 89%, 90%, 91%, 92%, 93%, 94%, or 95%. As noted below in the examples, the system 10 of the present description can provide for conversion as high as 95%, such that the system 10 can provide for a conversion that is 5 times or more than that which has been typically possible in even the most efficient Haber-Bosch plants.

Such a high conversion can allow the system 10 to be on a much smaller scale than Haber-Bosch plants such that the system 10 can be a small-scale system that can be installed on-site where the ammonia is to be used. This can essentially eliminate $NH_3$ transportation costs. Moreover, operation on the small scale of the system 10 can have much lower energy requirements than a Haber-Bosch plant. In addition, because of the high conversion, the $H_2$ feed gas can be provided via methods other than steam reforming of natural gas, further reducing the energy requirements of the system 10. For example, the $H_2$ feed 6 can be provided, for example, via electrolysis of water, which is not practical on very large scales, but which can be economically viable on small scales such as system 10. The $N_2$ feed gas 4 can be provided, for example, using selecting membranes to separate nitrogen gas from air.

The flow rates, volumes, and other values described above with respect to the system 10 are not intended to be limiting and are simply added to provide context. The values can be scaled up or down by a person of skill in the art depending on the desired output of the system 10.

EXAMPLES

The embodiments of the present invention can be better understood by reference to the following example which is offered by way of illustration. The present invention is not limited to the example given herein.

Example 1

Nitrogen gas ($N_2$) and hydrogen gas ($H_2$) are fed into a 0.25 L reactor 12 that has been pre-heated to about 400° C. The reactor 12 includes a wüstite ($Fe^{[2+]}O$) catalyst reactor bed 14. The $N_2$ gas is fed to the reactor at a rate of about 0.5 SLPM and the $H_2$ gas is fed to the reactor at a rate of about 1.5 SLPM. A trace amount (e.g., about 0.1-0.3 SLPM) of argon gas (Ar) is also fed to the reactor for gas chromatograph (GC) analysis, as described below. Reaction product gas (e.g., ammonia ($NH_3$)) and unreacted $N_2$ and $H_2$ gas are allowed to flow into a 0.25 L absorber 16 with a bed of magnesium chloride ($MgCl_2$) operating at the 200° C. bed until the pressure within the system has reached 80 bar. A recirculation pump 24 is then turned on to recycle the absorber outlet gas, which includes unabsorbed $NH_3$ and unreacted $N_2$ and $H_2$, back to the reactor 12. The flow rate of the recycled gas can be from about 0.25 SLPM to about 10 SLPM. The gasses are allowed to proceed through the system (e.g., from the reactor 12, to the absorber 16, and through the recycle 22 back to the reactor 12) for a designated amount of time of from about 5 minutes to about 60 minutes, such as about 30 minutes. After the designated amount of time, the pressure in the system is released, such as via a gate valve, which causes ammonia to desorb from the $MgCl_2$.

Ammonia conversion in the reactor and ammonia absorption in the absorbent bed can be monitored using an electric pressure transducer to measure changes in system pressure and a gas chromatograph (GC) to measure gas phase chemical composition. Pressure changes measured by the transducer can be used to calculate anticipated chemical compositions. 1 mL gas samples are obtained from a needle bleed valve downstream of the absorber. The gas samples are injected into an Agilent Plot Q column for GC analysis for confirmation on these calculations. The GC column can be held at −60° C. for 3 minutes and then ramped up to 160° C. over eleven minutes, and helium is used as carrier gas. Peaks corresponding to hydrogen, nitrogen, and argon (a trace amount is used as an inert standard) are seen between 1 and 3 minutes while ammonia is seen after 10 minutes.

Figure 2:
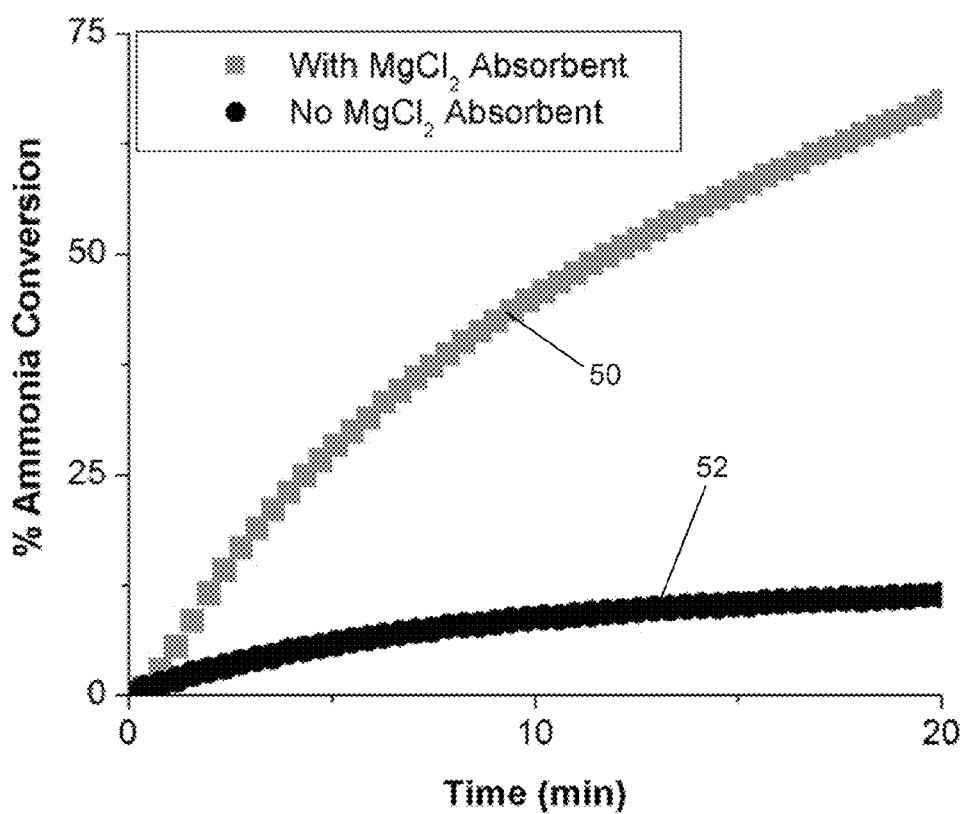
FIG. 2 is a graph showing conversion data the system of FIG. 1 compared to a control system where ammonia is not absorbed in a magnesium chloride absorbent.

As shown in FIG. 2, the data series 50 for when $MgCl_2$ absorbent is present indicates an increase in ammonia conversion and the conversion rate compared to data series 52 when the $MgCl_2$ absorbent is not present. As shown by data series 52, when no $MgCl_2$ is present the reaction only achieves about 13% conversion in 20 minutes, and a final equilibrium conversion of about 16.3%. As shown with data series 50, when the $MgCl_2$ absorbent is present, 70% of the available nitrogen and hydrogen have been converted to ammonia after 20 minutes. If the reaction is allowed to run to completion, conversions of >95% were obtained.

Figure 3:
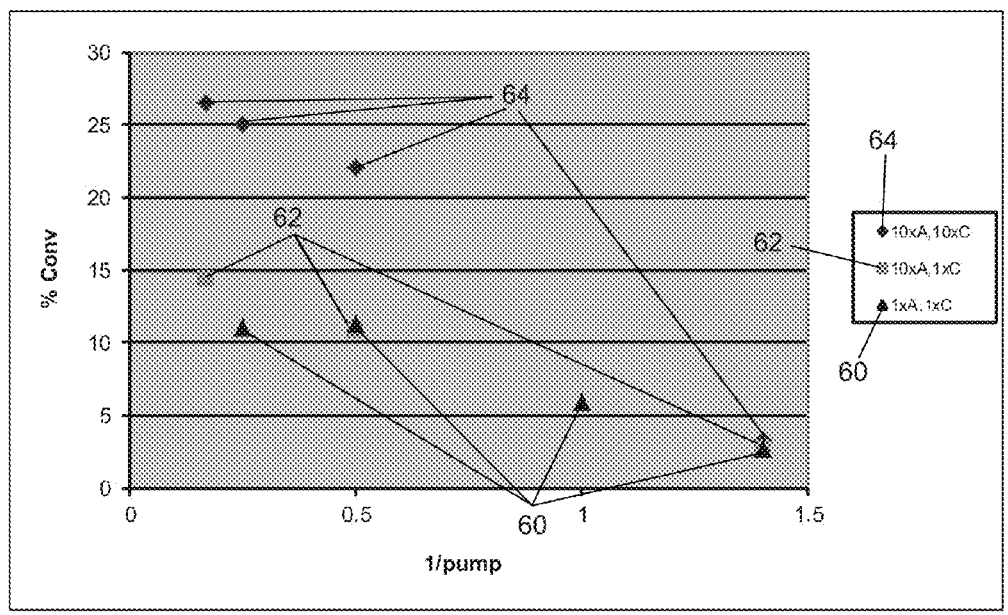
FIG. 3 is a graph showing conversion data comparing the conversion to ammonia based on recycle flow rate for various catalyst and absorbent loading.

FIG. 3 shows the relationship between $NH_3$ conversion and the recycle flow rate within the system. FIG. 3 plots the percent conversion after about 5 minutes on the Y-axis versus the inverse of pumping speed of the recycle pump 24, which is directly related to the recycle flow rate produced by the recirculation pump 24.

Data series 60 in FIG. 3 shows the resulting data for a first arbitrary amount of catalyst in the reactor 12, in this case about 1.5 g of catalyst, and a first arbitrary amount of $MgCl_2$ absorbent in the absorber 16, in this case about 1.5 g of $MgCl_2$ absorbent. Data series 62 shows the resulting data for the same first arbitrary amount of catalyst in the reactor 12, e.g., 1.5 g of catalyst, but with a larger, second arbitrary amount of MgCl$_2$ absorbent in the absorber that is 10 times greater than the first arbitrary amount of MgCl$_2$ absorbent, e.g., about 15 g of absorbent. A comparison of data series 60 and data series 62 shows that increasing the amount of MgCl$_2$ absorbent in the absorber seems to have little to no effect. Data series 64 shows the resulting data for a second arbitrary amount of catalyst in the reactor 12 that is 10 times greater than the first arbitrary amount of catalyst, e.g., about 15 g of catalyst, and for the second arbitrary amount of MgCl$_2$ absorbent in the absorber 16 that is 10 times greater than the first arbitrary amount of MgCl$_2$ absorbent, e.g., about 15 g of MgCl$_2$ absorbent. A comparison of data series 62 and data series 64 shows that increasing the amount of catalyst in the reactor 12 by a factor of 10 increases conversion to NH$_3$ by a factor of about 2.

Example 2

Theory

In order to better describe the systems described herein, such as system 10, the following theory regarding the mechanism of conversion to NH$_3$ and adsorption of NH$_3$ will be described. Because the reaction reduces the number of moles in the system as shown in Reaction [4], there is a change in total pressure in the system over time.

$$N_2 + 3H_2 \rightleftharpoons 2NH_3 \quad [4]$$

The system involves three rates: that of reaction, that of absorption, and that of convection, i.e., that due to the pump. The reaction making ammonia is, under practical conditions, controlled by nitrogen absorption on the catalyst. Under many important conditions, the rate $r_{N_2}$ of nitrogen consumption per reactor volume is given by the Temkin-Pyzhev equation, shown as Equation [5]:

$$r_{N_2} = -k_R p_{N_2} \left(\frac{p_{H_2}^3}{p_{NH_3}}\right)^\alpha + k_R' \left(\frac{p_{NH_3}^2}{(p_{H_2})^3}\right)^{1-\alpha} \quad [5]$$

where $p_i$ is the partial pressure of component "i", $k_R$ and $k_R'$ are forward and reverse reaction rate constants, and a is a parameter close to one half. While this equation often successfully correlates experimental data, it is less successful at low partial pressures of ammonia. That is the case studied here. In this limit, an alternative expression is shown in Equation [6]:

$$r_{N_2} = \frac{-k_R p_{N_2}}{\left(1 + K p_{NH_3}/p_{H_2}\right)^\beta} \doteq -k_R p_{N_2} \quad [6]$$

where $k_R$, K, and $\beta$ are different kinetic constants. The inventors have assumed that in experiments absorption keeps the ammonia pressure low, providing for simple linear kinetics on the extreme right of Equation [6].

Experiments have shown that the absorption rate per absorbent volume $r_{NH_3}$ of pure low pressure ammonia by magnesium chloride can be explained at small times by the penetration theory of mass transfer according to Equation [7]:

$$r_{NH_3} = \left(\sqrt{\frac{D}{\pi t}} \frac{Ha}{RT}\right) p_{NH_3} \quad [7]$$

where D is the diffusion coefficient of ammonia in solid MgCl$_2$, t is the time, a is the absorbent area per bed volume, and H is a partition coefficient between solid and gas. In system 10, ammonia can be adsorbed from a high pressure mixed gas, ammonia concentration gradients may exist both in the solid and in the mixed gas. Therefore, the inventors have postulated that the rate per absorbent volume $r_{NH_3}$ can also be defined by Equation [8]:

$$r_{NH_3} = k_A a (p_{NH_3} - p^*_{NH_3}) \quad [8]$$

where $k_A$ is an overall mass transfer coefficient for absorption and a is the absorbent area per absorbent volume. The effective equilibrium partial pressure may be high if the amount of absorbent is so limited that it is saturated.

Next, these rate processes and the flow through the recycle 22 can be combined to find the overall rate of the process. In experiments, such as in the Examples below, the gas flow rates have been about 2 L/min, and the entire equipment volume has been about 0.3 L, so the cycle times is under 10 sec, much shorter than the total time of the experiments. Thus, a single cycle is near steady state, even though the total experiments are unsteady.

A mass balance on the ammonia in the reactor can be performed, where it is assumed that the reactor is well-mixed due to its relatively small size, which is represented by Equation [9]:

$$0 = Q(p_{NH_3} - p_{NH_3}') + 2k_R V_R (p_{N_2}' - p_{NH_3}/K) \quad [9]$$

where $p_i$ and $p_i'$ are the inlet and outlet partial pressures of species "i", Q is the flow rate, $V_R$ is the reactor volume, and K is an apparent equilibrium constant for the ammonia synthesis reaction. A similar balance on the ammonia in the absorber can also be performed, where again it is assumed that the absorber is well mixed, represented by Equation [1]:

$$0 = Q(p_{NH_3}' - p_{NH_3}) - k_A a V_A (p_{NH_3} - p^*_{NH_3}) \quad [10]$$

where $p_i$ and $p_i'$ are now the outlet and inlet pressures, $V_A$ is the solid absorbent volume, and $p_{NH_3}^*$ is the ammonia pressure which would be in equilibrium with the solid. There can also be a stoichiometric constraint, represented by Equation [11]

$$2(p_{N_2} - p_{N_2}') = p_{NH_3}' - p_{NH_3} \quad [11]$$

By combining Equations [9], [10], and [11], and assuming a pseudo-steady state approximation on ammonia gas—e.g., that ammonia produced equals ammonia absorbed—allows for the elimination of $p_{N_2}'$ and $p_{NH_3}'$ to provide Equation [12]:

$$p_{N_2} = \frac{p_{NH_3}}{K} + \left[\frac{k_A a V_A}{Q}\left(\frac{1}{K} + \frac{1}{2}\right) + \frac{k_A a V_A}{2 k_R V_R}\right](p_{NH_3} - p^*_{NH_3}) \quad [12]$$

At longer times and after many cycles, an unsteady state balance on nitrogen in the full system volume, that is, both reactor and absorber, can be performed. The overall nitrogen atom gas balance, continuing the pseudo-steady-state assumption on ammonia gas occurring after the short transient buildup of ammonia, shows that twice the moles of nitrogen gas converted to ammonia gas equals the moles of ammonia absorbed by the solid, which can provide Equation [13]:

$$2 \frac{(V_R + V_A)}{RT} \frac{dp_{N_2}}{dt} = -k_A a V_A (p_{NH_3} - p^*_{NH_3}) \quad [13]$$

Combining Equations [12] and [13] produces Equation [14]:

$$2\frac{(V_R+V_A)}{RT}\frac{dp_{N_2}}{dt} = -\frac{p_{N_2}-p^*_{NH_3}/K}{\left[\frac{1}{2k_RV_R}+\frac{1}{Kk_AaV_A}+\left(\frac{1}{K}+\frac{1}{2}\right)\frac{1}{Q}\right]} \quad [14]$$

As will be appreciated, the apparent rate constant for the reactor loop can increase with absorber rate and capacity, and it can also increase with flow rate. Both trends reflect improved removal of product ammonia from the reactor, thereby suppressing the reverse reaction. When absorption and pumping are fast enough, and the absorbent affords a low equilibrium ammonia partial pressure, Equation [14] suggests the best case where the rate observed approaches the forward reaction rate.

In most examples, pseudo-steady-state ammonia gas partial pressure can be assumed, producing Equation [15]:

$$\frac{dp}{dt} = -\frac{5}{2}\frac{dp_{N_2}}{dt} \quad [15]$$

Neglecting the transient as the ammonia partial pressure builds up to the pseudo-steady-state value, which can be approximated as Equation [16]:

$$p = p_0 - 5/2(p_{N_2,0}-p_{N_2}) \quad [16]$$

This the reactor loop transient in terms of the total pressure p is approximated according to Equation [17]

$$\frac{dp}{dt} = -k(p-p^*) \quad [17]$$

where p* is the final equilibrium pressure, and k is an overall rate constant for these experiments, equal to the reciprocal of the product of $V_R$ and the quantity in square brackets in Equation [14].

Equation [17] can be used to analyze the data presented in the EXAMPLE below, and merits some discussion. First, the final value of $p_{N_2}$ or p includes both the effects of reaction equilibrium (as K) and absorption equilibrium (as $p^*_{NH_3}$). Second, the three rate processes involved are harmonically averaged in k as resistances in series. The resistance of the reaction kinetics is [$1/k_R$]. The resistance of absorption is [$V_R/Kk_A aV_A$]; note this varies with reaction reversibility (as K) and with the amount of absorbent (as $V_A$). The resistance also depends on the size of the absorbent particles, for a equals (6/d) where d is the adsorbent particle size, the diameter for spheres or the side for cubes. The resistance of the pump, that is, the delay in moving the ammonia from the reactor to the absorber, is represented by the term containing the flow Q. We will use these approximate expectations as a basis for discussing our experiments, described next.

Materials

Reagent grade anhydrous magnesium chloride ($MgCl_2$), purchased from Sigma Aldrich, was used without further purification. 1.5 g of a pre-reduced magnetite ($Fe_3O_4$) catalyst, sold under the trade name AmoMax-10 from Süd-Chemie, was used for each experiment. Both the $MgCl_2$ and catalyst were stored in an inert nitrogen environment. The gases $N_2$, $H_2$, Ar, and He (ultrahigh purity; 99.9995%) were purchased from Matheson Trigas. Brooks 0-5 VDC mass flow controllers were used to control gas supply from the pressurized cylinders. Liquid nitrogen was purchased from Matheson Trigas in 160 L dewars.

Apparatus

A lab-scale apparatus, similar to that shown schematically in FIG. 1, was built using Swagelok 316 stainless steel tubing. The reactor and absorbent vessels were of 1 inch diameter tubing. The catalytic reactor, 4 inches long and containing the magnetite catalyst, was positioned upstream from an absorbent vessel containing the $MgCl_2$ crystals. One of two absorbent vessels was used: the smaller was 2 inches long, and the larger was 5.5 inches long. Both the catalyst and $MgCl_2$ were supported on quartz wool. Heating tapes connected to Variacs were used to control the temperatures in the reactor and the absorbent vessel, which were measured by Omega KMTIN-032U-12 thermocouples within the vessels. A Micromega CN77000 programmable PID controller was used to maintain the temperature within the catalyst bed in the reactor. A WIKIA pressure transducer (Model #8392476) mounted directly before the reactor, and a US Gauge 0-2000 psig analog pressure gauge, placed after the absorbent bed, were used to measure system pressure. The system was operated as a circulating batch system with a variable speed piston pump (Model PW2070N, Pump-Works, Minneapolis, Minn.) powering the flow of gases through the system. An Agilent 6890 gas chromatograph was used to analyze gas phase composition. A Hewlett-Packard Plot Q 30 m×0.32 mm 20 μm capillary column—HP 19091P-Q04—was used to analyze 1 mL gas samples for hydrogen, nitrogen, and ammonia. Both the reactor and absorbent vessel could be isolated for detailed experiments. National Instruments Labview software was used to control and record data from the mass flow controllers, actuator, and pressure transducer.

An Agilent 6890 gas chromatograph with a Hewlett-Packard Plot Q 30 m×0.32 mm 20 μm capillary column (HP 19091P-Q04) was used for analysis of gas compositions. Helium was used as an inert carrier at constant makeup rate. A trace amount of argon was added to the reaction system with the nitrogen and hydrogen for use as an inert in GC analysis. A Swagelok SS-4BMW bleeder valve installed downstream of the absorbent vessel was used to obtain small gaseous samples periodically. One ml of each sample was injected into the column for analysis. The column was held at −60° C. for three minutes during which time $H_2$, $N_2$, and Ar exited the column. The column was then heated at a rate 20° C. per minute for twelve minutes to elute the ammonia. Thus fourteen minutes were required to elute all four gases. The system took roughly four minutes to cool for the next injection. Since the amount of argon in the system remained constant, it was used to determine the response factor RF of the other gases according to Equation [18]

$$RF = \frac{F_{gas}}{A_{gas}} \div \frac{F_{inert}}{A_{inert}} = \frac{F_{gas}}{F_{inert}}\left(\frac{A_{inert}}{A_{gas}}\right) \quad [18]$$

where F is the flow of the gas of interest, and A is the area under the peak. Once the response factors for $N_2$, $H_2$, and $NH_3$ based on Ar were calculated, they were used to determine the amount of the gas of interest. System conversion was then calculated based on $N_2$ and $H_2$ measurements. The average of these two values was reported as percent system conversion, as shown in Equations [19] and [20]:

$$\% \ Conv_{N_2} = 2*100*\left(\frac{N_2-N_2^{initial}}{N_2^{initial}}\right) \quad [19]$$

$$\% \; Conv_{H_2} = \frac{2}{3} * 100 * \left( \frac{H_2 - H_2^{initial}}{H_2^{initial}} \right) \qquad [20]$$

Agilent ChemStation software was used to control and record data from the gas chromatograph.

Procedure

To ensure that the catalyst was properly reduced, the catalyst was pretreated before any ammonia experiments were begun. New catalyst was added to the reactor and the reactor sealed. Stoichiometric nitrogen and hydrogen were flowed through the reactor vessel while slowly heating the reactor to 400° C. over 16 hours. The reactor was then held at 400° C. for 24 hours while flowing nitrogen and hydrogen to ensure the protective coating was burned off and the catalyst fully reduced. During the entire reduction, the system pressure was held at 8 MPa using a CPU-controlled actuator at the system exit.

For each experiment, the reactor vessel was preheated to 400° C. over two hours and held at that temperature for one hour before the experiments began. If the absorbent vessel was used during the experiment, it was preheated to 200° C. over two hours and held at that temperature for one hour as with the reactor. Before the first experiment, the system was flushed with $N_2$ at 1 SLPM for 30 minutes. A similar flushing was performed for 15 minutes following each experiment. All system contents were flared to exhaust during the $N_2$ flushing and when emptying the system after each experiment.

To pressurize the system, the system exit valve was closed. Most experiments used either the reactor alone or the reactor and the absorbent vessel. Mass flow controllers were then used to feed $N_2$ and $H_2$ into the system at a molar ratio of 1:3, along with a trace amount of Ar to assist in chromatographic analysis. The recirculating pump, when used, was turned on at the beginning of system pressurization. The recirculation rate was varied from 0.5-6 SLPM. Once the system reached the operating pressure of 80 bar, the feed valve to the system was closed and the mass flow controllers turned off. The system was allowed to react for at least 45 minutes Small gas samples were pulled from the system using the bleeder valve every ~20 minutes for analysis. Once the experiment was complete, the system exit valve was opened, the system contents completely emptied and flared to exhaust, and $N_2$ flushed through the system for 15 minutes.

Experiments focusing on strictly the absorption of $NH_3$ by $MgCl_2$ were operated in a slightly different manner First, the system consisting of the reactor and recycle line only was reacted to equilibrium, which took roughly three hours. This resulted in a $NH_3$ gas phase mole fraction of 15.6±0.3. The three-way valves were then quickly operated in a way to introduce the gases produced into the empty, pre-heated absorbent vessel. The pressure in the absorbent vessel was monitored. This allowed the absorption kinetics of the $MgCl_2$ to be studied at higher total pressures than possible using pressurized $NH_3$ cylinders.

Results

The conversion rate of nitrogen and hydrogen to ammonia via the Haber-Bosch process is a function both of catalyst activity in gases and of diffusion in solid magnesium chloride. The rates and the mechanism for this conversion are the focus of the experiments reported herein.

Figure 4:
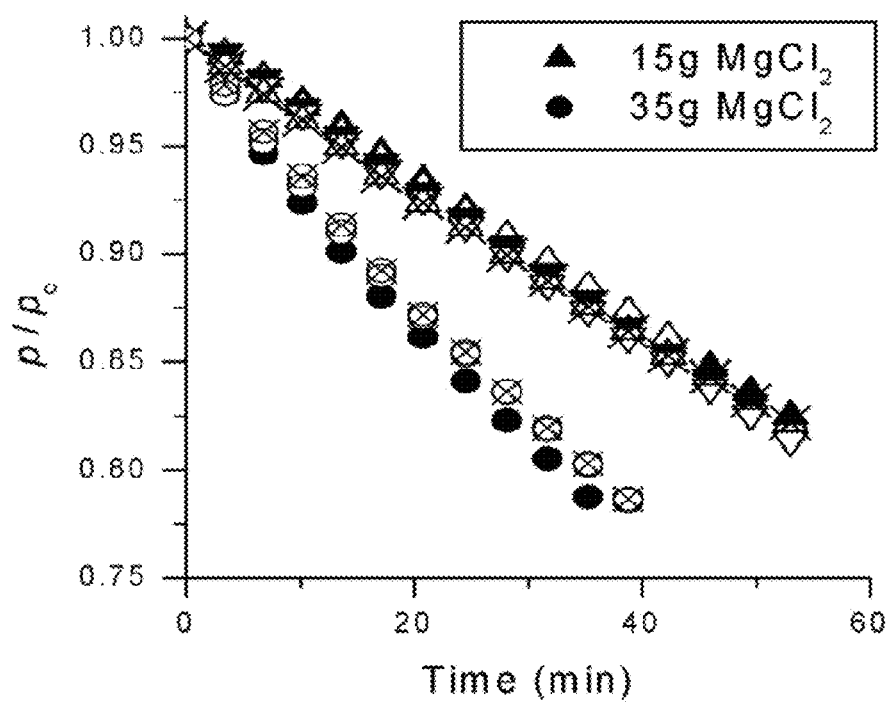
FIG. 4 is a graph showing data from repeated measurements of ammonia synthesis and absorption with the reactor being operated at 400° C. and the absorber being operated at 200° C.

Data illustrating the reproducibility of these experiments are shown in FIG. 4. Normally, the key measurement is of the system's total pressure as a function of time. The system is initially charged with stoichiometric amounts of nitrogen and hydrogen to an initial temperature of 400° C. Two groups of such experiments, shown in FIG. 4, used 1.5 g catalyst with either 15 or 35 g $MgCl_2$ absorbent. The system's pressure p, normalized with its initial pressure of 80 bar, decays with time as shown with a reproducability of ±3%. This is typical of all our measurements.

The better conversion effected by the presence of the absorbent $MgCl_2$ is illustrated in FIG. 4. Each of these groups of experiments used 1.5 g catalyst; all but one also used magnesium chloride in the amounts shown. The conversion at a given time is dramatically improved by adding absorbent. Only 1.5 g of absorbent increases conversion by 12 times. 15 and 35 g $MgCl_2$ adsorbent increase conversion 13 and 18 times, respectively.

The reasons for these increases in conversion vary, as suggested by the theory summarized by Equations [14] and [17] above. If Equation [17] is integrated for small conversion, it produces Equation [21]:

$$\frac{p - p^*}{p_0 - p^*} = e^{-kt} \qquad [21]$$

Figure 5:
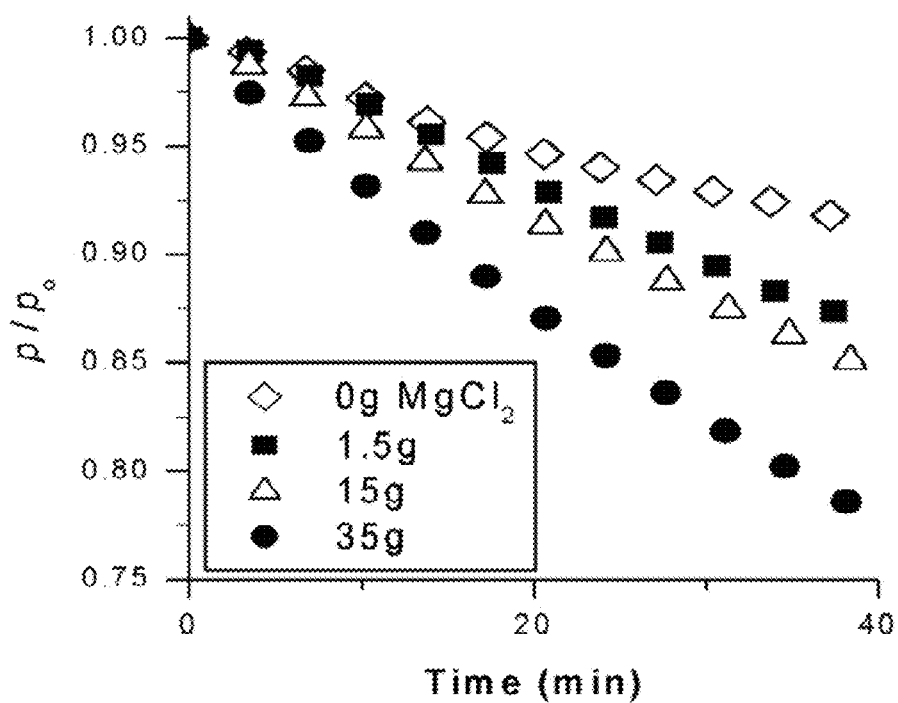
FIG. 5 is a graph showing data of reactor pressure versus the amount of absorbent.
Figure 6:
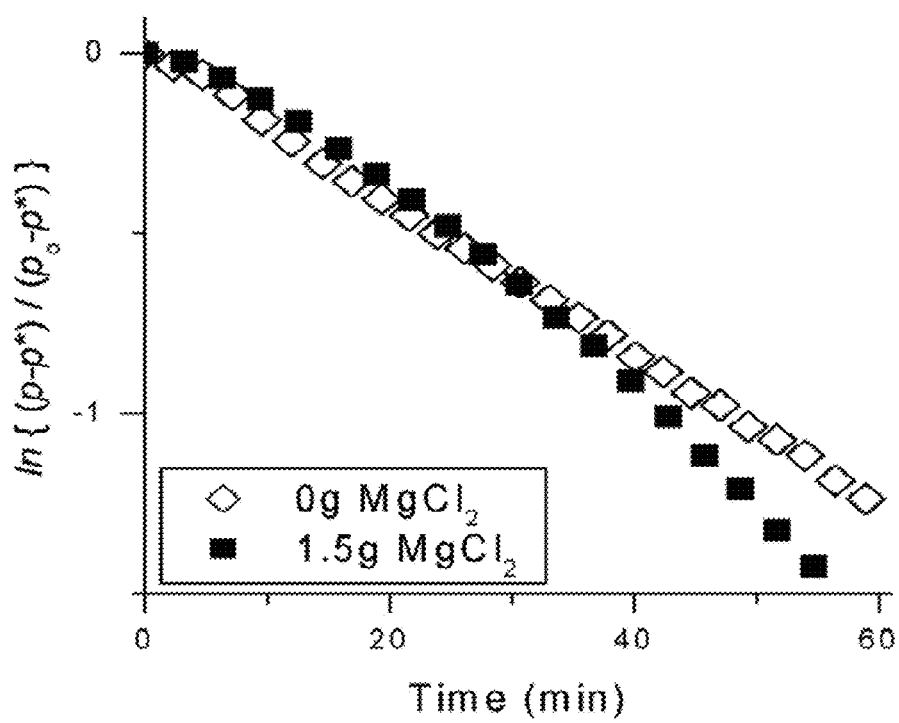
FIG. 6 is a graph showing data from the reaction with minimal absorption.

A plot of the logarithm of the left hand side of Equation [21] should be linear in time, which is confirmed in the data shown in FIG. 6. As shown in FIG. 6, the initial slopes of the data for 0.0 and 1.5 g absorbent are substantially the same, even though the degree of conversion shown in FIG. 5 is different. From these slopes, it can be inferred that the catalyst activity is about 0.38 kg $NH_3$/hr kg catalyst. This agrees with values in the literature, which range for 0.3 to 0.4 and average 0.35 in the same units. This difference between FIGS. 5 and 6 largely reflects the altered overall equilibrium, even while the apparent initial rate is almost the same. This implies that under these conditions, the overall rate constant k is almost independent of the amount of $MgCl_2$ because so little of it is added.

Figure 7:
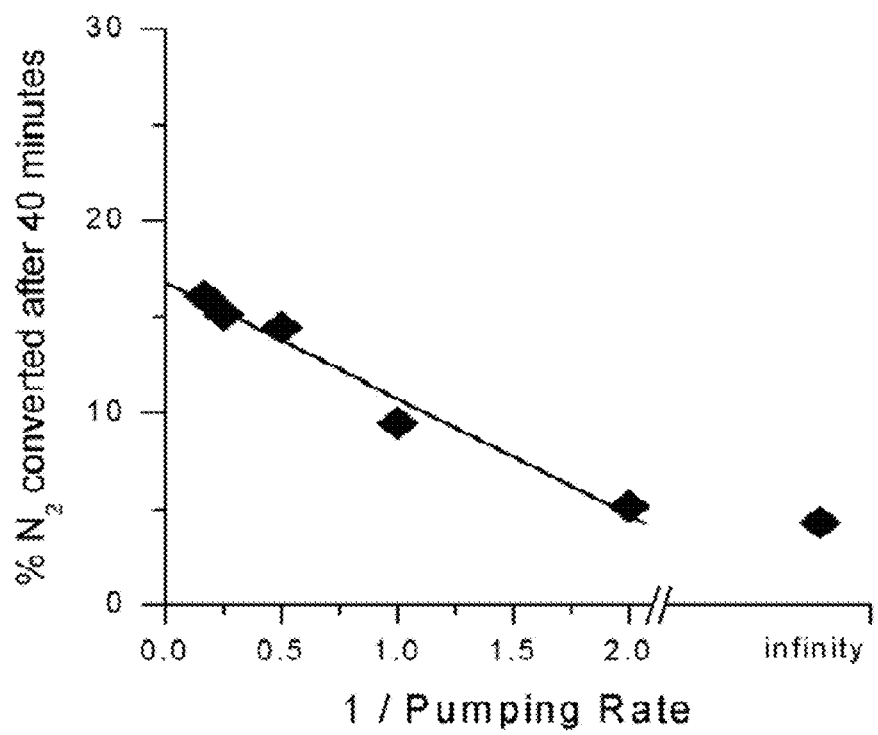
FIG. 7 is a graph showing data from the reaction without absorption versus the pumping rate.

The resistances of chemical kinetics and of flow both matter, as shown by the experiments without any $MgCl_2$ absorbent, shown in FIG. 7. In FIG. 7, the conversion is plotted vs. the reciprocal of flow rate: the line showing nitrogen conversion equals (16.8-6.1 (pumping rate)). Low flow rates can result in low conversion because the reaction is slowed by the reverse reaction as the ammonia produced is allowed to stay longer and reach higher concentration in the reactor, and the empty absorber isn't helping except by diluting the product.

Figure 8:
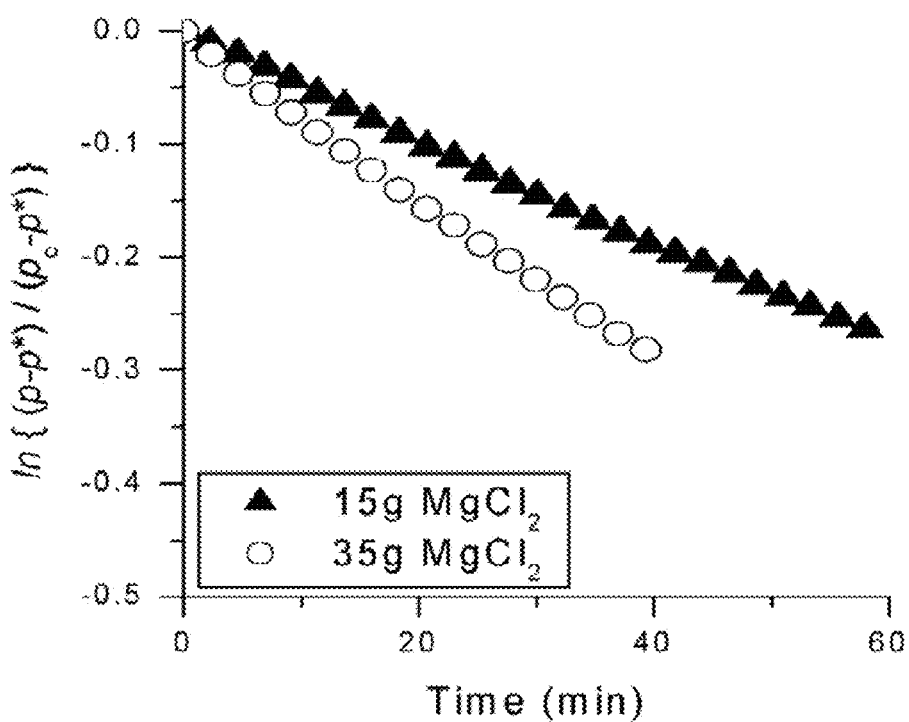
FIG. 8 is a graph showing data from the reaction with absorption versus time.

The kinetics for larger amounts of absorbent also fit the first order kinetics of Equation [21], as shown in FIG. 8. However, the rates, which include the effect of equilibria lowered by ammonia absorption, show a clear effect of the absorbent amount, e.g., more absorbent raises the apparent rate constant. This is consistent with Equation [14], which suggests that in the limit of high absorption rate and flow rate, one could achieve a forward reaction rate dominated by chemical kinetics.

Figure 9:
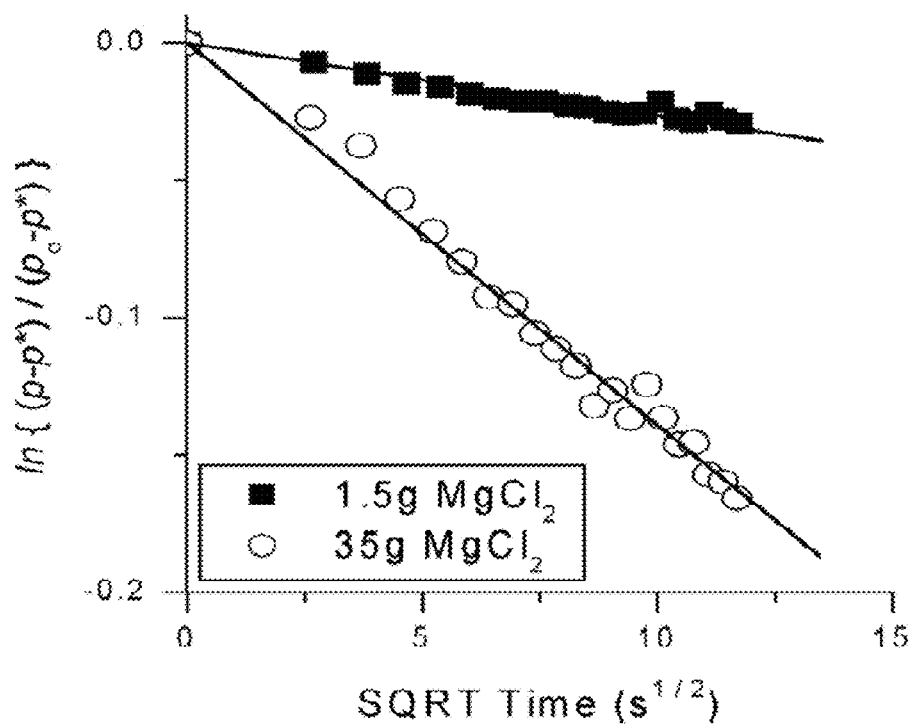
FIG. 9 is a graph showing data from absorption of ammonia without additional reaction.

A difficulty remaining in this analysis is demonstrated, however, by a somewhat different set of experiments where the system is started and run until some ammonia has been made. Then, the absorber is isolated from the reactor by closing inlet and outlet valves, and the absorber pressure is measured as a function of time. The results do not show the variation suggested by Equation [21], which is log linear in time. Instead, the logarithm of pressure varies with the square root of time, as shown by the results in FIG. 9. Such behavior is a common characteristic of a diffusion-controlled process, in particular where the data is consistent with the penetration theory of mass transfer. This is true both when absorption occurs from the $N_2$—$H_2$—$NH_3$ mixtures used here and from pure ammonia, as demonstrated in the literature. However, the details of the rate-limiting step in the literature are not completely clear. The ratio of the slopes of the lines shown in FIG. 9 is 5.3:1. If mass transfer were the only concern, the ratio of the slopes should be the ratio of the absorbent surface areas, which is $(35/1.5)^{2/3}$, or 8.2:1. The reason for this discrepancy is not clear, but may reflect altered absorbent geometry. In addition, the partition coefficient measured here at 200° C. was 0.0367 g $NH_3$/atm $cm^3$ $MgCl_2$. The average earlier value in the literature between 172 and 235° C. was similar but smaller, 0.012 in the same units.

Figure 10:
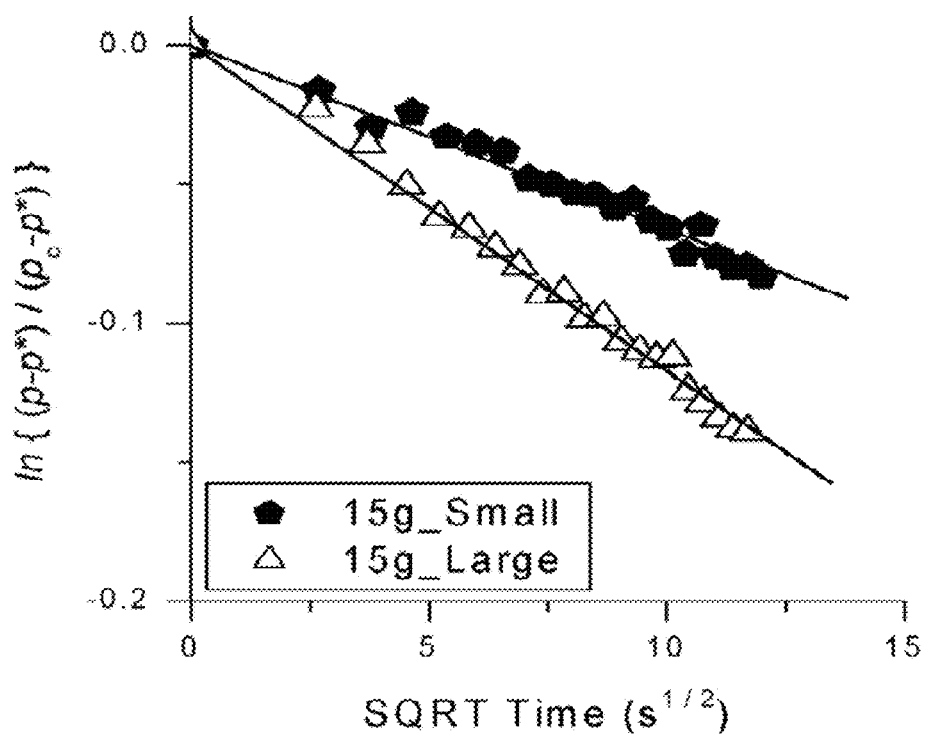
FIG. 10 is a graph showing data from absorption in different beds.

While the results in FIG. 9 imply that absorption can be controlled by diffusion only in the solid, the inventors are not sure whether this is always completely true. In one attempted redesign of the absorber, 15 g $MgCl_2$ was diluted with a roughly equal volume of glass beads. As shown in FIG. 10, absorption rates in this diluted bed are 1.8 times faster than in the undiluted bed, strongly indicating diffusion in the gas adjacent to the particles is important. In particular, the data in the small bed—the pentagons—have a slope of 0.0066; but the results for the diluted bed—the triangles—have a slope is 0.0117, or a ratio of 1.77. This suggests that the mass transfer coefficients are larger when the bed is diluted, indicating a mass transfer resistance in the gas phase as well as in the solid.

The theory and experiments above show how the conversion of nitrogen and hydrogen into ammonia can be increased with a solid ammonia selective absorbent Ammonia synthesis is exothermic, and so occurs spontaneously at ambient temperature and pressure. However, the rate can be very slow, in some examples so slow that practical amounts of ammonia are not produced. To overcome this, Haber famously used a catalytic reaction at high pressure and temperature. The high pressure enhanced ammonia conversion because the number of moles in the reaction decreases. The high temperature increased the reaction rate, but at the expense of reducing the equilibrium conversion. Commercial reactors are currently run at high pressure and temperature with only perhaps 20% conversion, which necessitates cooling the product gases, separating the ammonia, and recycling the unreacted hydrogen and nitrogen.

The data in this Example suggests one way of potentially removing the need for nitrogen and hydrogen separation and recycling. It shows that an ammonia-selective absorbent, such as $MgCl_2$, can dramatically increase the conversion. In the simplest case studied here, shown in FIG. 11, the conversion is increased from around 20% to over 95%. If larger amounts of adsorbent are used, even higher conversion may be possible.

However, this conclusion can be clouded by the interaction of kinetics and equilibria. The kinetics includes those of chemistry, of flow, and of absorption, as summarized by Equations [14], [17] and [21]. The equilibria involve those of both reaction and absorption. These can complicate the interpretation of the data.

To illustrate this, consider the kinetics shown in FIG. 5, which shows the changes in total pressure as a function of time. The pressure changes for catalyst without absorbent may first appear to be less than those caused by catalyst plus absorbent, at least at larger times. But, according to Equations [14] and [17] this cannot be true at very small times. Specifically, when additional kinetic resistances from flow or from absorption are added, then the rates cannot be faster than that expected for the reaction alone. To be sure, the rate of absorption shown in FIG. 6 is initially extremely fast, but even this would just make the initial overall rates of the two processes have the same, kinetically-limited speed. However, the experiments described in this Example could not reliably be made at such small times that no sort of equilibrium affects the measurements. When the data like those in FIG. 5 is examined, it should be remembered that conversion can be affected by both kinetics and equilibria.

Figure 11:
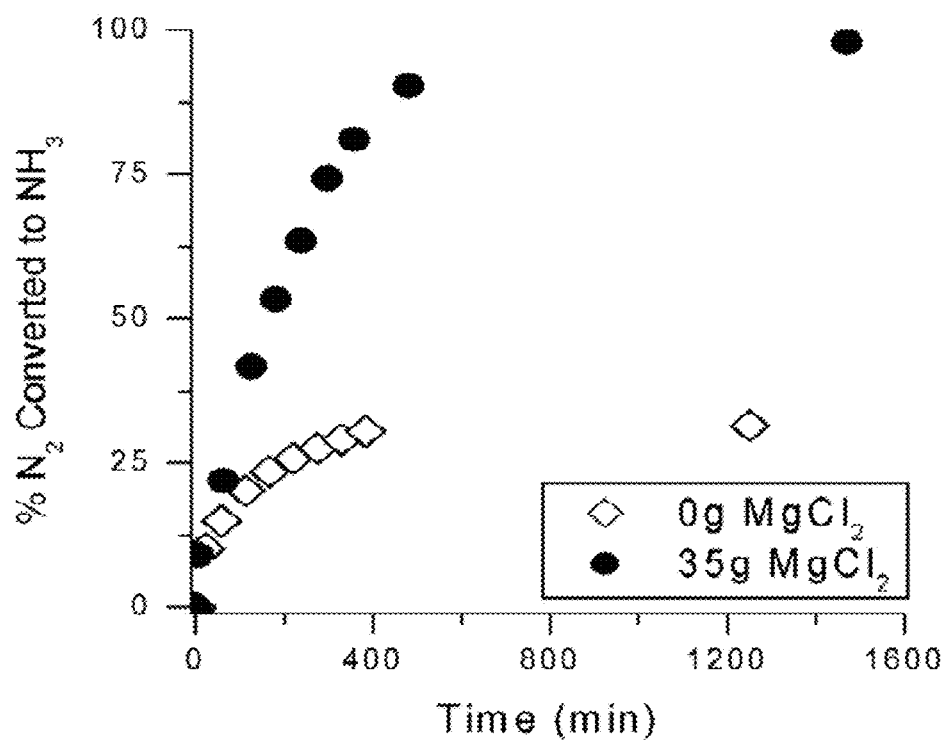
FIG. 11 is a graph showing data on conversion with an $MgCl_2$ adsorbent and without.

This complexity can influence strategies about how to reduce the time required for high conversion, which FIG. 11 shows can be much higher when the absorbent is present. In particular, for the conditions shown, the conversion with an absorbent can takes about forty times longer than that with catalyst alone. It is believed that the absorbent kinetics can be increased in at least three ways: by increasing the absorbent volume, by decreasing the absorbent particle size, or by frequently regenerating the absorbent.

To increase the absorbent kinetics forty times, e.g., to account for the longer time required to achieve conversion with the adsorbent, the volume of the adsorbent particles could simply be increased by forty times. This will reduce the resistance to solid diffusion by forty times by changing the term ($Kk_A$ $aV_a$) in Equation [14]. This should conceivably work for the conditions in FIG. 11, but the further increase in absorbent volume will have less effect because the rate of ammonia production will now more nearly be controlled by chemical kinetics. But, because it appears there will already be enough capacity for ammonia from the results in FIG. 11, it can result in considerable excess capacity in the larger absorber. However, the absorbent is inexpensive.

Alternatively, smaller absorbent particles can be used to provide a larger surface area and get similar results. For example, if four times more volume of 20 μm particles were used (instead of 200 μm particles), it would, theoretically, result in the same change in the term ($Kk_A$ $aV_a$). Such smaller particles are often used in separation processes to get faster mass transfer rates, though these particles will risk higher pressure drops through a packed bed in an absorber. To get both fast kinetics and low pressure drop, absorbent particles 20 μm or smaller could be used that are supported on 200 μm glass beads.

A third method of accelerating the absorption step is to regenerate the absorbent frequently. The gain in doing this can depend on the fact that the chemical kinetics is first order in time, but that the absorption varies with the square root of time (see, for example, FIGS. 6 and 9). Thus, absorption is fastest at small times, always faster than kinetics. Better conversion can be achieved if frequent regeneration of the absorbent particles is performed. A variety of cycle times for doing so were considered, recognizing the strong parallels with pressure swing adsorption, but the process has not been studied sufficiently to provide a basis for intelligent choice between these. We do want to emphasize, however, that this is still another way to accelerate absorption.

The inventors have also considered whether the catalyst and the absorbent can function better in a separate reactor and absorber, or whether they can work better in one combined piece of equipment. In most chemical syntheses, the reaction and separation are better carried out in two separate pieces of equipment because each process can be optimized via the specific conditions used. Some of this optimization has been performed in this Example, e.g., running the reactor at 400° C. and the absorber at 200° C.

The higher reactor temperature can give faster kinetics; and the lower absorber temperature can give more favorable absorber equilibrium. In addition, separate equipment can provide for easier separation and regeneration of a loaded absorber without changing the conditions in the reactor. Thus, the reactor can continue to operate at what is basically a steady state, even while different absorbers are cycled in and out of the system. The idea of a separate reactor and absorber can also offer the chance of effective heat integration in larger scale systems. While both the reaction and absorption is exothermic, the desorption needed for $MgCl_2$ salt regeneration is endothermic. The obvious process improvement is to use reactor heat to regenerate the $MgCl_2$ adsorbent.

At the same time, the prospect of putting catalyst and absorbent particles in the same piece of equipment is intriguing because it would simplify the process, for example because there would be no need for a recycle line, a recirculation pump, or any extra heat exchange equipment, which could result in a very simple ammonia synthesis process suited for distributed manufacture. In such manufacture, a single site, such as a farm, could potentially make its own fertilizer. However, in preliminary experiments, it was found that mixing catalyst and absorbent gave poor results. Without wishes to be bound by any theory, the inventors suspect that the $MgCl_2$ as received may contain small amounts of water, especially since this salt does form a variety of stable hydrates. The water in these hydrates would be expected to spoil Haber process catalyst. It could be possible to fuse the absorbent and then grind it under dry conditions to insure that no water is present, but experiments to these effects were not conducted at this time.

The terms and expressions which have been employed are used as terms of description and not of limitation, and there is no intention that in the use of such terms and expressions of excluding any equivalents of the features shown and described or portions thereof, but it is recognized that various modifications are possible within the scope of the inventive subject matter claimed. Thus, it should be understood that although the embodiments of the present invention have been specifically disclosed by examples and optional features, modification and variation of the concepts herein disclosed may be resorted to by those of ordinary skill in the art, and that such modifications and variations are considered to be within the scope of the subject matter of the present invention as defined by the appended claims.

What is claimed is:

1. A system for producing ammonia, the system comprising:
   a reactor configured for receiving nitrogen feed gas ($N_2$) and hydrogen feed gas ($H_2$), the reactor comprising a catalyst configured to convert at least a portion of the nitrogen gas and at least a portion of the hydrogen feed gas to ammonia ($NH_3$) to form a reactant mixture comprising the ammonia and unreacted nitrogen feed gas and unreacted hydrogen feed gas;
   an absorbent configured to selective absorb at least a portion of the ammonia from the reactant mixture;
   one or more control systems configured to control a reaction temperature and a reaction pressure in the reactor during conversion of the portion of the nitrogen feed gas and the portion of the hydrogen feed gas to ammonia, and to control an absorption temperature and an absorption pressure at the absorbent during selective absorption of at least the portion of the ammonia from the reactant mixture, wherein the one or more control systems are configured to control the reaction temperature to 350° C. or greater and to control the absorption temperature to from about 170° C. to about 200° C.; and
   a recycle line to recycle the unreacted nitrogen feed gas, the unreacted hydrogen feed gas, and unabsorbed ammonia to the reactor.

2. The system of claim 1, wherein the absorbent has a selective affinity for absorbing ammonia that is higher than its affinity for absorbing nitrogen gas or hydrogen gas.

3. The system of claim 1, wherein the absorbent comprises magnesium chloride ($MgCl_2$).

4. The system of claim 1, wherein the one or more control systems are configured to control the temperature of the absorbent to a desorption temperature configured to provide for desorption of absorbed ammonia from the absorbent.

5. The system of claim 1, wherein the one or more control system systems are configured to control pressure applied to the absorbent to a desorption pressure configured to provide for desorption of absorbed ammonia from the absorbent.

6. The system of claim 1, wherein overall conversion of the nitrogen feed gas and the hydrogen feed gas to ammonia for the system is at least about 50%.

7. The system of claim 1, wherein overall conversion of the nitrogen feed gas and the hydrogen feed gas to ammonia for the system is at least about 70%.

8. The system of claim 1, wherein overall conversion of the nitrogen feed gas and the hydrogen feed gas to ammonia for the system is at least about 80%.

9. The system of claim 1, wherein overall conversion of the nitrogen feed gas and the hydrogen feed gas to ammonia for the system is at least about 90%.

10. A method for producing ammonia, the method comprising:
    reacting at least a portion of a nitrogen feed gas ($N_2$) and at least a portion of a hydrogen feed gas ($H_2$) in the presence of a catalyst in a reactor to form ammonia ($NH_3$), wherein unreacted nitrogen gas ($N_2$), unreacted hydrogen gas ($H_2$), and the ammonia ($NH_3$) form a reactant mixture;
    controlling a temperature in the reactor to a reaction temperature;
    controlling a pressure in the reactor to a reaction pressure;
    selectively absorbing at least a portion of the ammonia from the reactant mixture with an absorbent;
    controlling a temperature at the absorbent to an absorption temperature of from about 170° C. to about 200° C.;
    controlling a pressure at the absorbent to an absorption pressure; and
    following the selective absorbing, recycling the unreacted nitrogen gas, the unreacted hydrogen, and unabsorbed ammonia to the reactor.

11. The method of claim 10, wherein the absorbent has a selective affinity for absorbing ammonia that is higher than its affinity for absorbing nitrogen gas or hydrogen gas.

12. The method of claim 10, wherein the absorbent comprises magnesium chloride ($MgCl_2$).

13. The method of claim 10, wherein the absorption pressure at the absorbent is from about 50 bar to about 100 bar.

14. The method of claim 10, wherein overall conversion of the nitrogen feed gas and the hydrogen feed gas to ammonia from the method is at least about 50%.

15. The method of claim 10, wherein overall conversion of the nitrogen feed gas and the hydrogen feed gas to ammonia from the method is at least about 70%.

16. The method of claim 10, wherein overall conversion of the nitrogen feed gas and the hydrogen feed gas to ammonia from the method is at least about 80%.

17. The method of claim 10, wherein overall conversion of the nitrogen feed gas and the hydrogen feed gas to ammonia from the method is at least about 90%.

* * * * *

UNITED STATES PATENT AND TRADEMARK OFFICE
CERTIFICATE OF CORRECTION

PATENT NO. : 9,914,645 B2
APPLICATION NO. : 14/535491
DATED : March 13, 2018
INVENTOR(S) : Heath H. Himstedt et al.

Page 1 of 1

It is certified that error appears in the above-identified patent and that said Letters Patent is hereby corrected as shown below:

On the Title Page

Column 1, Item (60), "61/901,127" should be --61/901,128--.

In the Specification

Column 14, Line 45, "(pumping rate))" should be --(pumping rate)$^{-1}$)--.

In the Claims

Column 18, Claim 5, Line 18, "system systems" should be --systems--.

Signed and Sealed this
First Day of May, 2018

Andrei Iancu
*Director of the United States Patent and Trademark Office*